S. B. NEWBERRY.
PROCESS OF MAKING CEMENT AND BY-PRODUCTS.
APPLICATION FILED JUNE 1, 1920.
1,366,479.
Patented Jan. 25, 1921.
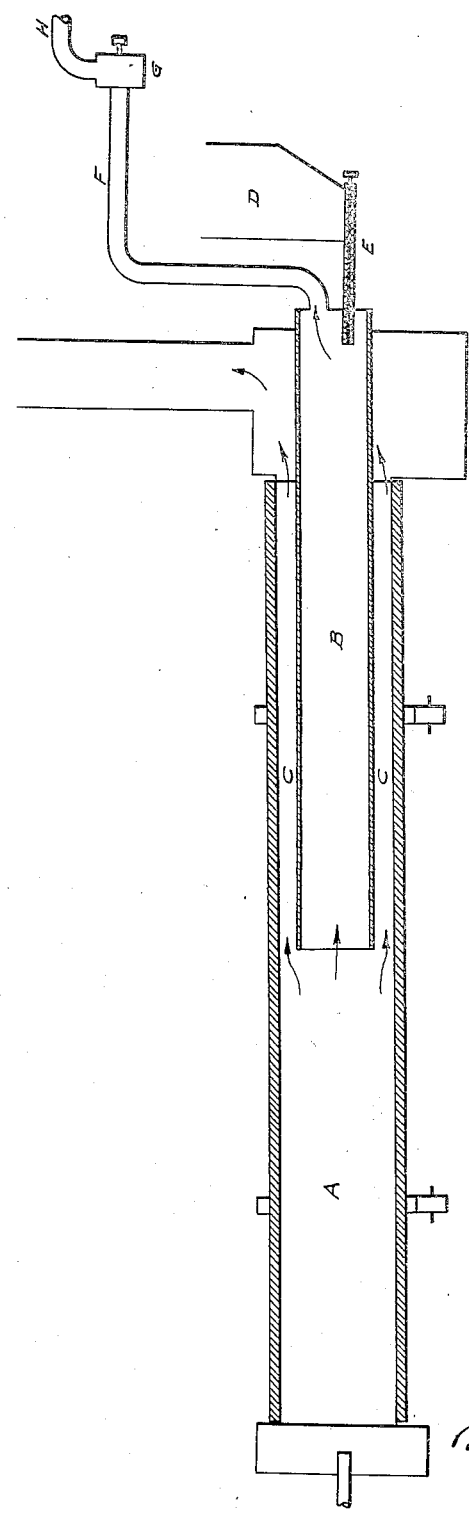

UNITED STATES PATENT OFFICE.

SPENCER B. NEWBERRY, OF CLEVELAND, OHIO.

PROCESS OF MAKING CEMENT AND BY-PRODUCTS.

1,366,479.    Specification of Letters Patent.    Patented Jan. 25, 1921.

Application filed June 1, 1920. Serial No. 385,709.

*To all whom it may concern:*

Be it known that I, SPENCER B. NEWBERRY, a citizen of the United States, and residing at Cleveland, Cuyahoga county, State of Ohio, have invented certain new and useful Improvements in Processes of Making Cement and By-Products, of which the following is a specification.

It is well known that cement, commonly known as Portland cement, is made by calcining at high heat, in stationary vertical or nearly horizontal revolving kilns, a suitably proportioned mixture of calcareous material such as limestone, and argillaceous material in the form of clay or shale. The fuel for this calcination is usually mixed with the charge in vertical kilns, or in the case of revolving kilns is blown in at the discharge end of the kilns in the form of coal-dust, oil or gas. In the processes usually followed the fuel is completely burned and the products of combustion discharged through stacks, and no recovery of by-products from the fuel is attempted. It has, however, been proposed to distil bituminous coal or carbonaceous shale in retorts heated externally by the waste heat of the gases issuing from the kiln, collecting the gas, oil and ammonia so liberated from the fuel, and to grind the calcined residue of the fuel, containing argillaceous matter and fixed carbon, with calcareous material to form the raw cement mixture.

The method I have devised consists in grinding the raw fuel, bituminous coal or carbonaceous shale, with the calcareous material, and additional clay or shale if required, and in calcining the mixture in a kiln so designed and operated that in the first stage of the calcination the mixture is in contact with only a small part of the hot gases and is heated indirectly by the remainder of the gases. The volatile products from the fuel are thus kept separate from the waste gases of the kiln and are condensed and collected. The mixture passes continuously through the preliminary section of the kiln and is discharged into the calcining section in which it is burned to clinker. One means by which these results are accomplished is shown in the accompanying drawing. The single figure of the drawing is a longitudinal section through a rotary kiln with attached parts shown diagrammatically.

A is a rotary kiln, containing throughout part of its length an inner cylinder B, between which and the walls of the kiln A are flues C, C for the passage of the hot gases from the calcination. The mixed fuel and raw material are introduced into the upper end of this inner cylinder from the hopper D by means of the feed conveyer E. The mixture passes through the inner cylinder B and is exposed to gradually increasing external heat from the gases passing through the flues C, C, and in the course of its passage gives up its volatile constituents, gas, oil and ammonia, which are drawn from the cylinder through the pipe F by the fan G and discharged by the fan through the pipe H to well known condensing apparatus for recovery of the oil and ammonia. The gas remaining after the condensation, or such part thereof as may be required, is carried to the front of the kiln by a pipe not shown in the diagram, and there burned to provide heat for the calcination.

The mixture, freed from most or all of its volatile products, issues continuously from the inner cylinder B into the lower section of the kiln A, where it is raised to high temperature and converted into clinker and finally discharged at the lower end of the kiln. The suction produced by the fan G is so regulated as to be just sufficient to carry off the volatile products from the inner cylinder B, and also, if desired, to draw a very small proportion of the hot gases from the calcination through the inner cylinder to aid in the heating of the material and in carrying off the volatile products. The suction may with advantage be so adjusted that such a volume of the hot gases shall be drawn through the inner cylinder as will assist in the distillation of the fuel without unduly diluting the combustible gas so obtained.

The cement mixture containing the residual fixed carbon of the fuel and a small percentage of volatile matter not expelled at the temperature to which it has been raised, is continuously discharged from the inner cylinder into the lower section of the kiln, and here comes into contact with the full volume of hot kiln gases containing excess of air. In this atmosphere the carbon of the mixture is burned, raising the temperature first to the point at which the remaining carbon dioxid is expelled, and finally to the clinkering temperature. The combustible matter of the mixture is completely burned out in this stage, and the product discharged from the kiln at its lower end has the properties and composition of normal Portland cement clinker and requires only to be ground to powder to form Portland cement.

It is to be understood that the attached diagrammatic drawing is intended only to aid in making clear the course and successive stages of the process described, so that one skilled in the art can use the invention, the claims here being drawn to the process and not details of construction and design. The special form of kiln and auxiliary apparatus designed by me for conducting the process will be presented in another application.

The process described in the foregoing may now be briefly restated as follows:

The raw materials for making cement with the addition of carbonaceous fuel are finely ground, and the mixture fed into the upper end of the inner cylinder; this mixture may be in the form of dry powder, or molded or compressed into solid masses, or, with suitable adjustment of the dimensions of the sections of the kiln, in the form of wet slurry. In its passage through the inner cylinder the mixture is heated by the waste gases from the calcination which pass through the surrounding flues, and also by such part of these waste gases as may be drawn through the inner cylinder. In this stage of the process the volatile matter of the fuel is expelled and drawn off for treatment for the recovery of oil and ammonia, and the residual combustible gas carried, wholly or in part, to the front of the kiln where it is burned with air to furnish supplementary heat for the calcination. The mixture, containing residual fixed carbon and some volatile matter, flows out from the inner cylinder into the lower section of the kiln, in which it is burned to clinker by the heat of combustion of the fixed carbon and of the supplementary gaseous fuel.

In starting the kiln the use of supplementary fuel, either gas, oil or coal dust, is of course necessary until the interior of the kiln is brought to the necessary heat and the regular course of the charge through the kiln is established.

It is to be understood that the process described is applicable to the calcination of lime or other materials which require treatment similar to that applied in making cement, and this is intended to be covered by the claims. While I have shown a rotary kiln arranged nearly horizontal, it will be understood that my invention is not limited to use in kilns having either or both of these features but is applicable to any form of kiln in which the conditions and stages described are provided for by suitable construction, and this is intended to be covered by the following claims.

Having now described the invention what is claimed as new and desired to be secured by Letters Patent is:

1. The process of making cement clinker by preparing a finely ground mixture of cement raw materials and carbonaceous fuel, heating the mixture by external heat of the gaseous products of the subsequent stage of calcination, collecting and recovering the products volatilized from the fuel, and finally calcining the mixture by the combustion of the fixed carbon of the fuel.

2. The process of making cement clinker by preparing a finely ground mixture of cement raw materials and carbonaceous fuel, heating the mixture by external heat of the gaseous products of the subsequent stage of calcination and by direct contact with a part of said gaseous products, collecting and recovering the products volatilized from the fuel, and finally calcining the mixture by the combustion of the fixed carbon of the fuel.

3. The process of making cement clinker by preparing a finely ground mixture of cement raw materials and carbonaceous fuel, heating the mixture by external heat of the gaseous products of the subsequent stage of calcination, collecting and recovering the condensable products volatilized from the fuel, and finally calcining the mixture by the combustion of the fixed carbon of the fuel and of gas volatilized from the fuel.

4. The process of making cement clinker by preparing a finely ground mixture of cement raw materials and carbonaceous fuel, heating the mixture by external heat of the gaseous products of the subsequent stage of calcination and by direct contact with a part of said gaseous products, collecting and recovering the condensable products volatilized from the fuel, and finally calcining the mixture by the combustion of the fixed carbon of the fuel and of gas volatilized from the fuel.

5. The process of making cement clinker including preparing a finely ground mixture of cement raw materials and carbonaceous fuel, passing said mixture continuously through an elongated preliminary heating zone, and gradually raising its temperature therein until products of the fuel are volatilized without combustion, drawing off from said zone and recovering the products volatilized from the fuel, passing the devolatilized material of the mixture leaving said preliminary heating zone continuously through a combustion zone, burning the carbon in said material and calcining to clinker the cement material in said combustion zone by the direct heat of combustion and transmitting and imparting the required heat from the products of combustion so produced to said mixture in said preliminary heating zone indirectly through heat conducting material.

6. The process of making cement clinker including preparing a finely ground mixture of cement raw materials and carbonaceous fuel, passing said mixture continuously through an elongated preliminary heating zone, and gradually raising its temperature therein until products of the fuel are volatilized without combustion, drawing off from said zone and recovering the products volatilized from the fuel, passing the devolatilized material of the mixture leaving said preliminary heating zone continuously through a combustion zone, burning the carbon in said material and calcining to clinker the cement material in said combustion zone by the direct heat of combustion and transmitting and imparting the required heat from the products of combustion so produced to said mixture in said preliminary heating zone indirectly through heat conducting material, and continuously supplying part of said recovered volatilized products to and burning the same in said combustion zone.

7. The process of making cement clinker including preparing a finely ground mixture of cement raw materials and carbonaceous fuel, passing said mixture continuously through an elongated preliminary heating zone, and gradually raising its temperature therein until products of the fuel are volatilized without combustion, drawing off from said zone and recovering the products volatilized from the fuel, passing the devolatilized material of the mixture leaving said preliminary heating zone continuously through a combustion zone, burning the carbon in said material and calcining to clinker the cement material in said combustion zone by the direct heat of combustion and transmitting and imparting the required heat from the products of combustion so produced to said mixture in said preliminary heating zone indirectly through heat conducting material in larger part but partially through direct contact.

8. The process of making cement clinker including preparing a finely ground mixture of cement raw materials and carbonaceous fuel, passing said mixture continuously through an elongated preliminary heating zone and gradually raising its temperature therein until products of the fuel are volatilized without combustion, drawing off from said zone and recovering the products volatilized from the fuel, passing the devolatilized material of the mixture leaving said preliminary heating zone continuously through a combustion zone, burning the carbon in said material and calcining to clinker the cement material in said combustion zone by the direct heat of combustion and transmitting and imparting the required heat from the products of combustion so produced to said mixture in said preliminary heating zone indirectly through heat conducting material in larger part but partially through direct contact, and continuously supplying part of said recovered volatilized products to and burning the same in said combustion zone.

In testimony whereof I affix my signature.

SPENCER B. NEWBERRY.